125,102

UNITED STATES PATENT OFFICE.

ANJEL VAZQUEZ AND JUST EDMUND ROSENBERG, OF SANTIAGO, CHILI.

IMPROVEMENT IN PRESERVING MEAT, POULTRY, FISH, &c.

Specification forming part of Letters Patent No. 125,102, dated March 26, 1872.

*To all whom it may concern:*

Be it known that we, ANJEL VAZQUEZ and JUST EDMUND ROSENBERG, both of Santiago, Chili, but at present residing in London, England, have invented or discovered a certain "New or Improved Mode of Preserving Meat, Poultry, Fish, and Game;" and we do hereby declare the following to be a full, clear, and exact description thereof, that is to say—

The object of our invention is to preserve meat, poultry, game, and fish in the fresh or uncooked state.

We proceed as follows: We take a cask containing clear water and place therein acetate of lime, ($CaO, C_4H_3O_3$,) generally called brown acetate of lime, until the liquid marks 6° in the aerometer, (salt weight.) We then add a small quantity of pure acetic acid ($C_4H_3O_3$ $HO$) of 8° in the aerometer, (acid weight,) so that the liquid will produce a sensible acid reaction upon blue reaction paper. The liquid being thus prepared and filtered, if necessary, is ready for use in the preservation of the meat. The casks to be employed should be a little more than half filled with the liquid and be then filled up with the meat. It is advantageous to place the meat in the neutral liquid first—that is to say, in the solution of acetate of lime—and to leave it there for two or three days, the position of the casks being altered each day. Then the acetic acid is added and the casks filled up with the neutral solution of acetate of lime.

If preferred, the liquid may be injected into the animal before it is divided into joints, but the immersion will generally be found sufficient.

The casks being closed the meat thus treated will remain quite fresh for a long time. When taken out for cooking it should be washed first with cold water, then with warm water, and afterward salt water, if necessary.

We claim as our invention—

The mode and compound herein described of preserving meat, poultry, game, and fish in the fresh or uncooked state.

In witness whereof we, the said ANJEL VAZQUEZ and JUST EDMUND ROSENBERG, have hereunto set our hands this fourteenth day of December, one thousand eight hundred and seventy-one.

ANJEL VAZQUEZ.
    J. E. ROSENBERG.

Witnesses:
    I. C. MEWBURN, 172 *Fleet Street, London.*
    GEO. BACON, 172 *Fleet Street, London.*